(12) United States Patent
De Miranda

(10) Patent No.: US 11,272,720 B2
(45) Date of Patent: Mar. 15, 2022

(54) WHOLE COFFEE BASED PROCESSES

(71) Applicant: Tierra Nueva Fine Cocoa, LLC, Miami, FL (US)

(72) Inventor: Luiz Fernando Ribeiro De Miranda, North Miami Beach, FL (US)

(73) Assignee: THE WHOLE COFFEE COMPANY LLC, Miami, FL (US)

( * ) Notice: Subject to any disclaimer, the term of this patent is extended or adjusted under 35 U.S.C. 154(b) by 2 days.

(21) Appl. No.: 16/309,674

(22) PCT Filed: Oct. 19, 2017

(86) PCT No.: PCT/US2017/057295
§ 371 (c)(1),
(2) Date: Dec. 13, 2018

(87) PCT Pub. No.: WO2018/236413
PCT Pub. Date: Dec. 27, 2018

(65) Prior Publication Data
US 2021/0219566 A1 Jul. 22, 2021

Related U.S. Application Data

(60) Provisional application No. 62/522,530, filed on Jun. 20, 2017.

(51) Int. Cl.
*A23F 5/10* (2006.01)
*A23F 5/08* (2006.01)
(52) U.S. Cl.
CPC ............. *A23F 5/105* (2013.01); *A23F 5/08* (2013.01)
(58) Field of Classification Search
CPC .................... A23F 5/08; A23F 5/105
See application file for complete search history.

(56) References Cited

U.S. PATENT DOCUMENTS 4,100,306 A * 7/1978 Gregg .................. A23F 5/265
426/386
4,591,508 A 5/1986 Pultinas
(Continued)

FOREIGN PATENT DOCUMENTS

DE 2431994 A1 7/1974
GB 2482032 A 1/2012
(Continued)

OTHER PUBLICATIONS

International Search Report and Written Opinion dated Jul. 1, 2016 for related international patent application No. PCT/US16/025628.
(Continued)

*Primary Examiner* — Anthony J Weier
(74) *Attorney, Agent, or Firm* — Morris, Manning & Martin, LLP; Bryan D. Stewart

(57) ABSTRACT

A process for preserving the organoleptic characteristics of coffee-based products and extending their shelf lives, having the steps of roasting the green coffee beans and placing it in a chamber with an inert gas atmosphere, first milling of the roasted coffee beans under inert gas conditions to a size between seventy five (75) and five hundred (500), second milling the previously milled roasted coffee beans under refrigerated conditions to ensure that the size of the bean particles fall between ten (10) and thirty (30) microns and jet milling the first and second milled coffee beans using a closed, or semi-closed, loop of inert gas jet mill to bring the bean particles' size between one tenth (0.1) and less than ten (10) microns resulting in an ultrafine powder. Micro-encapsulating or agglomerating the ultrafine powder with food ingredients, resulting in coated roasted whole coffee granules.

4 Claims, 1 Drawing Sheet

(56) References Cited

U.S. PATENT DOCUMENTS

| | | | |
|---|---|---|---|
| 6,569,486 B2* | 5/2003 | Cirkel-Egner | A23F 5/243 426/386 |
| 7,713,565 B2 | 5/2010 | Zeller et al. | |
| 9,314,042 B2 | 4/2016 | Abaurre | |
| 2006/0222753 A1 | 10/2006 | Harshberger | |
| 2010/0316785 A1 | 12/2010 | Morinaga et al. | |
| 2011/0027448 A1 | 2/2011 | Miller | |
| 2011/0059224 A1 | 3/2011 | Harrison | |
| 2011/0135802 A1* | 6/2011 | Robinson | A23F 5/405 426/595 |
| 2011/0135803 A1* | 6/2011 | Robinson | A23C 9/156 426/595 |
| 2012/0128851 A1 | 5/2012 | Brooks et al. | |
| 2012/0164277 A1* | 6/2012 | Robinson | A23L 33/10 426/72 |
| 2012/0164298 A1* | 6/2012 | Robinson | A23C 9/14 426/580 |
| 2012/0164299 A1* | 6/2012 | Robinson | A23C 9/156 426/588 |
| 2013/0202748 A1 | 8/2013 | Fountain et al. | |
| 2013/0260004 A1 | 10/2013 | Robinson et al. | |
| 2014/0147572 A1 | 5/2014 | Abaurre | |
| 2016/0051613 A1 | 2/2016 | Vella et al. | |
| 2019/0110492 A1* | 4/2019 | Abaurre | A23F 5/14 |

FOREIGN PATENT DOCUMENTS

| | | |
|---|---|---|
| WO | 199909587 A1 | 8/1999 |
| WO | 2016102335 A1 | 6/2016 |

OTHER PUBLICATIONS

International Search Report and Written Opinion dated Jan. 5, 2018 for related international patent application No. PCT/US17/057295.

Turchiuli et al. "Aroma Encapsulation in Powder by Spray Drying, and Fluid Bed Agglomeration and Coating", 2013, Advances in Food Processing Research and Applications, Food Engineering Series, pp. 255-265 p. 264, full para [1]; p. 256, para [1]; p. 256, full para [2]; p. 257, full para [1]; p. 259, para [1]; p. 260, full para.

Sanjeev et al. "Low Oxygen and Inert Gas Processing for Foods", Apr. 26, 2007, Clinical Reviews in Food Science and Nutrition, pp. 423-452, p. 423, para [4].

International Search Report and Written Opinion dated Jan. 30, 2020 for International Pat. Appl. No. PCT/US19/062074.

Elevitch et al., Coffee, Speciality Crops for Pacific Island Agroforestry, 1977 accessed at http://agroforestry.net/scps.

Ollivon et al, Tempering of Chocolate in a Scraped Surface Heat Exchanger, Journal of Food Science, vol. 62, No. 4, 1997, 773-780.

* cited by examiner

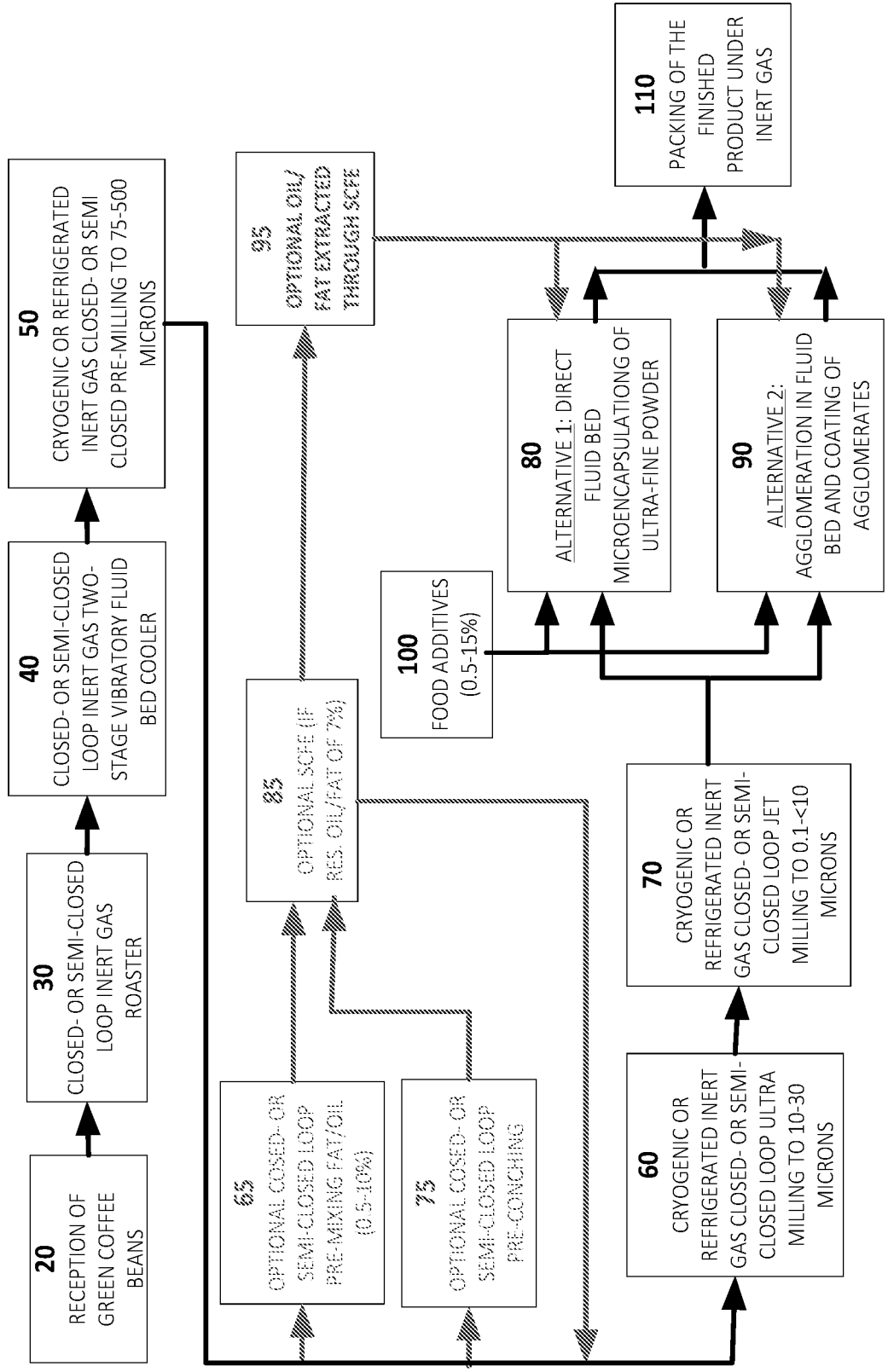

WHOLE COFFEE BASED PROCESSES

CROSS REFERENCE TO RELATED APPLICATIONS

This application is a national phase application of International Application No. PCT/US17/57295, filed Oct. 19, 2017, entitled "WHOLE COFFEE & WHOLE COFFEE BASED PROCESS AND PRODUCT," which claims benefit of and priority to U.S. Patent Application No. 62/522,530, filed Jun. 20, 2017, the disclosures of which are incorporated by reference as if set forth herein in their entireties.

BACKGROUND OF THE INVENTION

1. Field of the Invention

The present invention relates to a roasted and ground (R&G) whole coffee bean process and resulting products, wherein most of the chemical and organoleptic properties of roasted and ground beans are preserved for food and beverage consumption and its shelf-life extended.

2. Description of the Related Art

Several methods for processing whole coffee beans have been practiced in the past. Most of them involve domestic or commercial brewing of the roasted and ground coffee bean powder wherein only a small portion (with yields usually of 15-20%) of the coffee is utilized as (soluble) beverage. The option known as soluble (or instant) coffee is obtained through industrial percolation of R&G coffee under high pressure and high temperature conditions of the extractive water. This allows for higher soluble extraction rates and partial hydrolysis of the hydrolysable solids, with beverage yields usually of 33 to 45% of the original coffee. None of them, however, include an efficient process that utilizes nearly 100% of the R&G coffee, while preserving most of the R&G chemicals and aroma. The preservation of the aroma, in the present invention, is achieved by preventing the oxidation of the coffee during the process of coating and utilization of inert gas atmosphere during the entire process.

Applicant believes that a related reference corresponds to U.S. Pat. No. 9,314,042 ('042 patent) issued on Apr. 19, 2016, assigned to Tierra Nueva Fine Cocoa, LLC., and entitled "Method and Composition Used for the Manufacture of Coffee Liquor". However, it differs from the present invention, as follows:

First, the '042 patent utilizes as ingredient the standard R&G coffee, which was obtained through regular roasting and milling process conditions. This procedure exposes the resulting R&G to irreversible oxidation. The oxidation process takes place during the use of the initial process steps (i.e. the roasting and subsequently the milling). The coffee exposed to high roasting temperatures in the presence of atmospheric air and followed by atmospheric milling, initiates the irreversible oxidation process.

Secondly, the process in this present invention defines that all processing steps (including R&G roasting), should be performed under inert gas in a closed or semi-closed loop processing steps, i.e. in absence of O2. This is another important difference from the '042 patent and prior art.

Thirdly, the '042 patent relies on wet milling to obtain a particle not smaller than 10 microns. The average size sought for the final milled coffee particles is considerably further reduced to no greater than 5 microns.

The present invention also differs because the end-product in the '042 patent is obtained exclusively in the form of a liquid or paste, and not in form of a water-based soluble/dispersible powder as described and claimed herein.

The fat-based liquid product of the '042 patent has significant limitations for powder applications, where wettability, water-solubility, and/or overall dispersion ability, as well as other physical, chemical and/or rheological features, are all required when presented in powder form. In the present invention the microencapsulation of ultra-fine powder, or the agglomeration and subsequent coating of the granules uniquely allows to the powdered product to satisfy the above mentioned properties, while protecting the product from oxidation. The shelf life of the finished products could be further extended if the protective packaging is filled with an inert gas, thus preventing the direct contact between particles and atmospheric oxygen.

Other documents describing the closest subject matter provide for a number of more or less complicated features that fail to solve the problem in an efficient and economical way. None of these patents suggest the novel features of the present invention.

SUMMARY OF THE INVENTION

One of the main objects of the present invention is to provide a whole coffee bean process that preserves most of the chemical and organoleptic properties of the roasted and ground coffee bean.

It is another object of this invention to provide coffee products, wherein coffee essential oil (including oil-soluble aroma components) of the generated R&G coffee bean could be extracted, stored, and preserved until it is ready to be added-back to the whole coffee-based products before the full process is completed.

It is still another object of the present invention to provide a coffee product is soluble and dispersible in food liquids including water and milk.

It is yet another object of this invention to provide such a process that is feasible and economically viable to implement and to maintain the quality and flavor attributes of the whole coffee bean, while retaining its effectiveness for preparation and consumption.

Further objects of the invention will be brought out in the following part of the specification, wherein detailed description is for the purpose of fully disclosing the invention without placing limitations thereon.

BRIEF DESCRIPTION OF THE DRAWING

With the above and other related objects in view, the invention consists in the details of construction and combination of elements and process steps, conducting to the origination of innovative coffee and coffee-based products, as will be more fully understood from the following description, when read in conjunction with the accompanying drawing in which:

FIG. 1 is a block flow diagram showing the preparation of full whole coffee bean food and beverage products, presenting the various blocks of processing steps.

DETAILED DESCRIPTION OF THE EMBODIMENTS OF THE INVENTION

The present invention includes a complete process to manufacture coffee and coffee-based formulated products, encompassing roasting and cooling using inert gas as heating or cooling medium, cryogenic or refrigerated inert gas coarse (first) milling, optional mixing (Block 65) with vegetable fats and/or oils—preferably cocoa butter—optional conching (Block 75), optional SCFE (Block 85) (Super Critical Fluid Extraction)—depending on the level of oil/fat present, cryogenic (second) milling for fine-milling, cryogenic inert gas (third) ultra-milling, and completing the coffee and/or coffee-based finished products processing by either: 1) microencapsulating its ultra-fine particles; or 2) first agglomerating the ultra-fine particles and subsequently coating the resulting granules of the roasted and ground whole coffee beans.

The microencapsulation and coating are achieved with food ingredients or additives for: 1) improving wettability; 2) improving solubility/dispersion; and 3), to preserve or to increase the content of fresh coffee aroma from being stripped from the coffee bean particles, —especially during the hot water preparation of the coffee beverage.

Also, the ultrafine coffee particles (that are microencapsulated or the granules obtained from agglomeration) are coated with selected food ingredients and/or additives, as disclosed below. This technology provides a coffee particle with a surrounding coating to prevent the fine particles of the R&G coffee from being exposed to oxygen-rich atmospheres while in powdered form, and to help in the process of dispersion and solubilization of the coffee powder in liquids (before its preparation, as for example, in case of hot or cold beverages) with the most efficient use of the coffee bean.

By "particle size" in this specification and claims it is understood the mean size of the particles in a binomial distribution curve for the size of the particles.

The process in the present invention includes the following steps:

A) The first processing step (Block 30) is the roasting the whole coffee bean in an inert gas atmosphere, either in a closed or semi-closed loop system. The inert gas may be nitrogen ($N_2$) or another suitable inert gas. Heating media is used to raise the temperature in an enclosed chamber that houses a rotary cylinder or fluid bed containing the green coffee beans. The equipment operation can be performed in batch or continuous modes, depending on the volume of green coffee to be processed. The chamber is initially filled with an inert gas and maintained at a predetermined safe pressure, using a relief valve to regulate the pressure. The pressure inside the chamber is preferably kept between one (1) Bar and ten (10) Bars, while the temperature inside the rotary cylinders or at the fluid bed chamber is kept between 100° C. and 230° C., in absence of oxygen. The roasting step can extend from two (2) minutes to sixty (60) minutes, depending on the roasting profile desired. The roasting level could be low, medium, or high as is typically referred in the industry.

B) The second step of the process (Block 40) utilizes a two-stage vibratory fluid bed cooler to transport the roasted coffee bean. A closed-loop inert gas, two-stage fluid bed cooler that can be used is the Std. Model of the Food and Pharma Line, manufactured by Witte, 507 Rt. 31 S. Washington, N.J. 07882. The roasted coffee beans are cooled down in the first stage to a temperature between 50-100° C., but most preferably between 65° C. and 75° C. for at least one (1) minute, in order to interrupt the thermolysis process of the roasted bean. In the second stage, the temperature is brought down to ambient temperature. The objective being to stabilize the degree of the roasting level already achieved. The lower the temperature, the lower the undesirable thermolysis process. The roasted beans are kept at this temperature for a minimum of five (5) minutes, in order to facilitate the initiation of the degassing process on the roasted bean. The coffee beans can stay in the second stage indefinitely since it is shelf stable, provided the inert atmosphere is maintained. Both cooling stages are performed under an inert gas environment, by receiving a pressurized blow of cooled inert gas together with the mechanical vibratory screen to transport the beans forward. There is no oxygen present. During the first part of the cooling process, a spray may be added. The spray is a sugar solution containing between ten (10) percent to ninety (90) percent weight/weight. This may be done if it is desired to impart to the roasted beans a particular coffee taste and, in doing this, it also protects the roasted coffee beans against their precocity oxidation, in case the product is exposed to the atmospheric air.

C) The third step of the process (Block 50) is carried out by an initial (first) milling of the roasted coffee beans. This is done by utilizing a number of suitable commercial cryogenic or refrigerated inert gas-type dry mills. Suitable equipment for this step includes the pin or turbo-mill, or other suitable impact milling equipment, manufactured by companies such as Pallmann, Wolfstrasse 51, D-66482, Zweibrueken, Germany, and Hosokawa Alpine, Peter-Doerfler Strasse 13-25, D-86199, Germany, the latter marketed as model MP. These universal dry mills are capable of milling the whole roasted green coffee beans down to the desired initial particle size of the milled beans, at this stage, between 75 and 500 microns, but preferably between 100 and 300 microns. A narrow particle size distribution is obtained to prevent filter plugging while executing optional pre-conching step (Block 75). This first milling step is performed at a temperature range between −190° C. and 10° C., to ensure suitable brittleness for efficient cryogenic milling is achieved.

D) The fourth step of the process (Block 60) is designed to obtain essentially a whole coffee bean roasted and milled as a semi-finished product. For that the previously milled coffee is milled again for the second time under refrigerated or liquid inert gas (cryogenic conditions), to ensure that the final size of the bean particles falls between 10 and 30 microns. This can be accomplished by using available cryogenic ultra-mill equipment manufactured by Hosokawa Alpine, Germany, under its equipment model MP, or other suitable dry mill. This equipment can utilize a cryogenic inert gas (such as liquid $N_2$) that maintains the temperature, ensuring that the product can preferably reach low temperatures of around −80° C. before it is milled. For highly roasted coffee, it is possible to efficiently mill the product utilizing non-cryogenic conditions, i.e., by using refrigerated inert gas, provided that during the entire milling process the temperature is maintained below +10° C. The objective is to prevent that the product, during the milling process becomes overheated due to the mechanical effect of the milling.

E) In the fifth step of the process (Block 70), the twice milled beans are once again milled (i.e. by the third time), now using a close- or semi-closed loop cryogenic or refrigerated inert gas jet mill, a dry milling-type equipment. The equipment that can be used for this step is manufactured by several companies, such as Fluid Energy, 4300 Bethlehem Pike, Telford, Pa. 18969, and marketed under model Jet-o-Mizer. Other suitable ultra-fine mills, operating under cryogenic milling conditions could be utilized in lieu of the jet mill such as the cryogenic ball mill. The bean particles are brought between one tenth (0.1) and less than ten (10) microns. The preferred size being five (5) microns or less. The result being that the product becomes a very fine powder that requires special filtering equipment to prevent dusting during handling. The ultra-fine powder is then kept in an inert gas condition at all times to prevent aroma deterioration.

F) In the sixth step (Blocks 80 or 90), the ultrafine powder can be either directly micro-encapsulated (Block 80), or agglomerated and coated in the same equipment (Block 90). Both options provide the necessary protection against oxidation (atmospheric O2) with improved disperse ability and dispersion stability under liquid dispersion.

If the product is micro-encapsulated (Block 80), this process step is carried out by directly spraying on the ultra-fine powder, dispersant food ingredients and/or additives, respectively encompassing: sugar solutions and carbohydrate dispersions, and/or lecithins, tweens, spans, mono, and diglycerides, polyglycerols, and other antioxidants, emulsifiers, dispersants or stabilizers selected from the list of food additives approved by the US FDA to confer improved dispersion and stability of the micro-encapsulated coffee particles. This process step is carried out in a closed or semi-closed loop fluid bed drier, under refrigerated inert gas environment. The microencapsulation can be accomplished in batch or continuous mode for example, the continuous mode can be achieved using a spray drier, spray cooler, spray freezer or freeze drier.

A processing alternative (Block 90) that has proved to be more economical includes initially agglomerating the ultra-fine powder in refrigerated inert gas conditions, in a closed-loop or semi-closed loop fluid bed (dryer or cooler) type agglomerator (batch or continuous). For agglomeration, the ultra-fine particles are first sprayed in the water while they are transported in a fluid bed. This will wet the surface of the particles. The particles will adhere to each other forming the granules. Subsequently, the granules are sprayed with dispersants and food anti-oxidants to form a coating around the granules. The granules are thus protected against oxidation.

In the case of direct fluid bed microencapsulation (Block 80—Alternative 1), the coffee oil (Block 95) and specific food or additive microencapsulating solutions and/or dispersions (Block 100), are simultaneously pulverized through means of inner spray nozzles, configured to directly coat the individual ultra-fine particles inside the fluid bed dryer or cooler. The temperature is allowed to be brought up to room temperature.

For the agglomeration step (Block 90—Alternative 2), the process encompasses: pre-wetting (through means of a micro-spray of cold water), agglomeration, drying and cooling the on-going formed agglomerates, —with or without the simultaneous inclusion of coffee oil (Block 95). This is achieved by continuously micro-spraying suitable food grade ingredient or additives solution through internal nozzles (Block 100), especially configured to apply film-coating to the agglomerated particles, with the total spread content from 0.5% to 15% weight/weight of the coffee granules, depending on the desired level of protection, and the level of physical-chemical improvement sought for the properties of the agglomerates, whenever they are dispersed into hot or cool food liquids.

G) The resulting coated roasted whole coffee powder (or granulated products) (Block 110) is packaged in any of a wide range of packing options, including aluminum-plastic complex, BOPP, paper, plastic, glass, metal or combinations thereof. Although not required, the powder can be packed under inert gas, vacuum compensated or vacuum conditions, to secure that its long shelf-life (over one year) can be extended and/or maintained.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

INDUSTRIAL APPLICABILITY

It is apparent from the previous paragraphs that an improvement of the type for such a whole coffee based product and process is quite desirable for preserving its organoleptic characteristics and extending its shelf life.

What is claimed is:

1. A process for preserving the organoleptic characteristics of coffee-based products and extending their shelf lives, comprising the steps of:
    A) roasting a predetermined amount of green coffee beans between two (2) and sixty (60) minutes in an inert gas atmosphere inside a roasting chamber, kept at a temperature between one hundred (100) ° C. and two hundred and thirty (230) ° C. and pressure between one (1) and ten (10) Bars, said coffee being mechanically vibrated;
    B) placing said coffee beans in a chamber with an inert gas atmosphere and kept at a temperature between sixty-five (65) ° C. and seventy-five (75) ° C. for a minimum of one (1) minute, and subsequently, said temperature is lowered to reduce the thermolysis action of the coffee beans;
    C) first time milling the roasted coffee beans in an inert atmosphere to a size between seventy-five (75) and five hundred (500) microns at a temperature range between ten (+10° C.) and minus one hundred and ninety (−190° C.) to condition the beans for the extraction of fat;
    D) second time milling the first time milled roasted coffee beans at a temperature of less than ten (10) degrees centigrade, under inert conditions, to ensure that the final size of the bean particles fall between ten (10) and thirty (30) microns;
    E) third milling the first and second times milled coffee beans using inert gas atmosphere with a jet mill to bring the bean particles' size between one tenth (0.1) and less than ten (10) microns, resulting in an ultrafine powder; and
    F) micro-encapsulating the ultrafine powder by spraying the ultra-fine powder with food ingredients and/or additives in a closed or semi-closed loop fluid bed drier (or cooler) within a refrigerated inert gas environment resulting in coated roasted whole coffee granules.

2. The process set forth in claim 1 further including, after the first time milling third step and before the second time milling fourth step, the step of mixing the first time milled coffee beans with natural vegetable food fat or oil between five tenths of one percent (0.5%) and ten percent (10%) of the weight of the first time milled coffee bean under an atmosphere of inert gas, so that oxidation of the first time milled coffee beans is prevented while incorporating the fat or oil on the first time milled beans.

3. A process for preserving the organoleptic characteristics of coffee-based products and extending their shelf lives, comprising the steps of:
    A) roasting a predetermined amount of green coffee beans between two (2) and sixty (60) minutes in an inert gas atmosphere inside a roasting chamber, kept at a temperature between one hundred (100) ° C. and two hundred and thirty (230) ° C. and pressure between one (1) and ten (10) Bars, said coffee being mechanically vibrated;

B) placing said coffee beans in a chamber with an inert gas atmosphere and kept at a temperature between sixty-five (65) ° C. and seventy-five (75°) C. for a minimum of one (1) minute, and subsequently, said temperature is lowered to reduce the thermolysis action of the coffee beans;

C) first time milling the roasted coffee beans in an inert atmosphere to a size between seventy-five (75) and five hundred (500) microns at a temperature range between minus one hundred and ninety (−190) ° C. and ten (+10) ° C. to condition the beans for the extraction of fat;

D) second time milling the first time milled roasted coffee beans at a temperature of less than ten (10) degrees centigrade to ensure that the final size of the bean particles fall between ten (10) and thirty (30) microns;

E) third milling the first and second times milled coffee beans using inert gas atmosphere with a jet mill to bring the bean particles' size between one tenth (0.1) and less than ten (10) microns, resulting in an ultrafine powder; and F) agglomerating the ultrafine powder by spraying the ultra-fine powder with food ingredients and/or additives in a closed or semi-closed loop fluid bed drier (or cooler) within a refrigerated inert gas environment resulting in coated roasted whole coffee granules; and G) packing the granules.

4. The process set forth in claim 3 further including, after the first time milling third step and before the second time milling fourth step, the step of mixing the first time milled coffee beans with natural vegetable food oil between five tenths of one percent (0.5%) and ten percent (10%) of the weight of the first time milled coffee bean under an atmosphere of inert gas, so that oxidation of the first time milled coffee beans is prevented while incorporating the oil on the first time milled beans.

\* \* \* \* \*